United States Patent [19]
Ramsey

[11] 3,754,348
[45] Aug. 28, 1973

[54] FLOATING FISH TRAP

[76] Inventor: Frank J. Ramsey, P.O. Box 394, Stephenville, Tex. 76401

[22] Filed: Sept. 2, 1971

[21] Appl. No.: 177,889

[52] U.S. Cl. ................................................. 43/103
[51] Int. Cl. ............................................ A01k 69/06
[58] Field of Search .................... 43/103, 104, 56, 43/57, 65, 4, 100

[56] References Cited
UNITED STATES PATENTS

| | | | |
|---|---|---|---|
| 972,232 | 10/1910 | Pike | 43/103 |
| 1,588,224 | 6/1926 | Hoel | 43/103 |
| 2,522,017 | 9/1950 | Bergman | 43/57 |
| 2,912,785 | 11/1959 | Nudell | 43/56 |
| 2,968,887 | 1/1961 | Woolworth | 43/56 |
| 2,998,671 | 9/1961 | Hinton | 43/57 |
| 3,003,278 | 10/1961 | Armentrout | 43/103 |

*Primary Examiner*—Warner H. Camp
*Attorney*—Munson H. Lane et al.

[57] ABSTRACT

A horizontally elongated housing is equipped at the top thereof with an inflatable pad so that it floats in water. The housing contains bait and a fish entrance cone is provided at one end of the housing. The other end has a water passage with a motor-driven impeller, so that a stream of water is caused to flow through the housing and out of the fish entrance to attract fish which swim against the water stream toward the bait in the housing.

23 Claims, 14 Drawing Figures

Patented Aug. 28, 1973

INVENTOR
FRANK J. RAMSEY

BY *Munson H. Lane*

ATTORNEY

Patented Aug. 28, 1973

INVENTOR
FRANK J. RAMSEY

BY Munson H. Lane

ATTORNEY

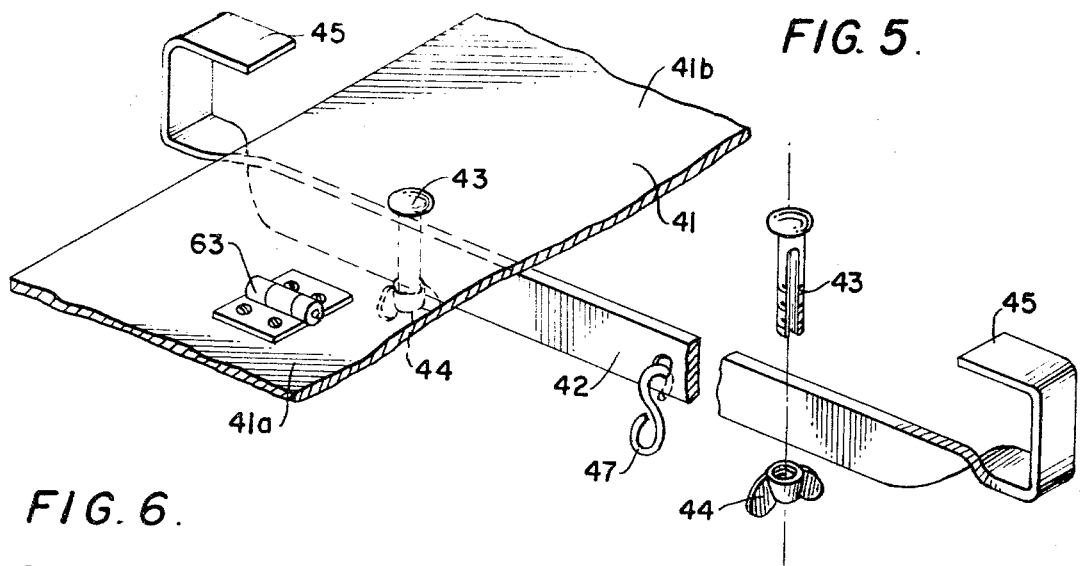
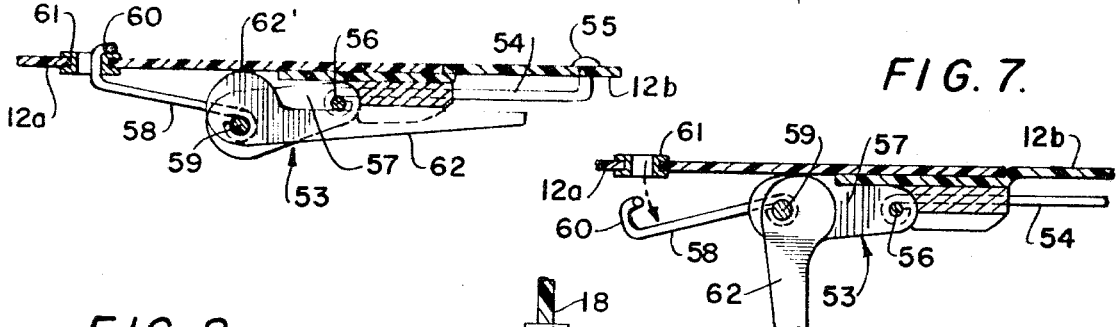
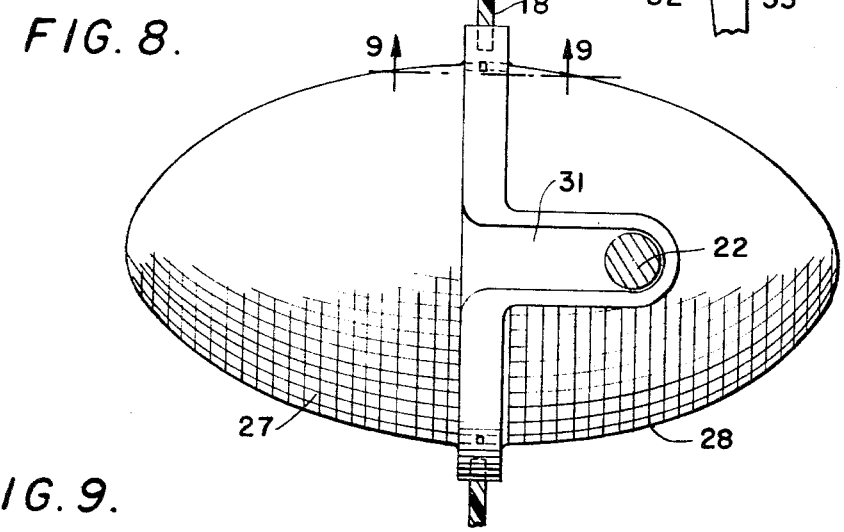
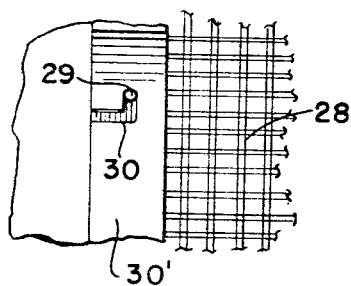

Patented Aug. 28, 1973

INVENTOR
FRANK J. RAMSEY

BY Munson A. Rane

ATTORNEY

FLOATING FISH TRAP

This invention relates to new and useful improvements in fish traps and in particular the invention concerns itself with a trap which is especially adapted for catching fish in still water such as earthen ponds on farms and ranches throughout the country.

Many of these ponds are stocked with game fish and these by nature feed near the surface and in running water where they may obtain adequate oxygen for their vigorous activity in their natural environment. However, in still water the oxygen supply is not adequate and, as a result, the fish are quite inactive, especially the large ones.

The principal object of the invention is to facilitate catching of fish in still water such as ponds or the like, this object being attained by the provision of a trap containing bait and equipped with means for inducing a stream of water past the bait, this being done near the water surface so that an adequate amount of oxygen is present in the water stream. Thus, the fish become stimulated and, by their natural instinct, swin against the water stream to the bait inside the trap.

In conjunction with the foregoing, another important object of the invention resides in the provision of a trap having a housing which contains an inflatable pad in the top thereof, whereby the trap floats in water near the surface where oxygen is more plentyful.

Still another important object of the invention is to provide a foating fish trap which is large enough to efficiently perform its function, but is constructed so that it may be quickly and easily taken apart for purposes of compact transportation or storage.

The trap of the invention is simple in construction, effective in use, and lends itself to economical manufacture.

With the foregoing more important objects and features in view and such other objects and features which may become apparent as this specification proceeds, the invention will be understood from the following description taken in conjunction with the accompanying drawings, wherein like characters of reference designate like parts, and wherein:

FIG. 5 is a fragmentary group perspective view of the holder and attaching means for the inflatable pad;

FIG. 6 is an enlarged sectional detail showing one of the housing section fasteners in its closed position;

FIG. 7 is a view similar to FIG. 6 but showing the fastener in its open position;

FIG. 8 is a fragmentary sectional view taken substantially in the plane of the line 8—8 in FIG. 2;

FIG. 9 is a fragmentary sectional detail taken substantially in the plane of the line 9—9 in FIG. 8;

Figure 1:
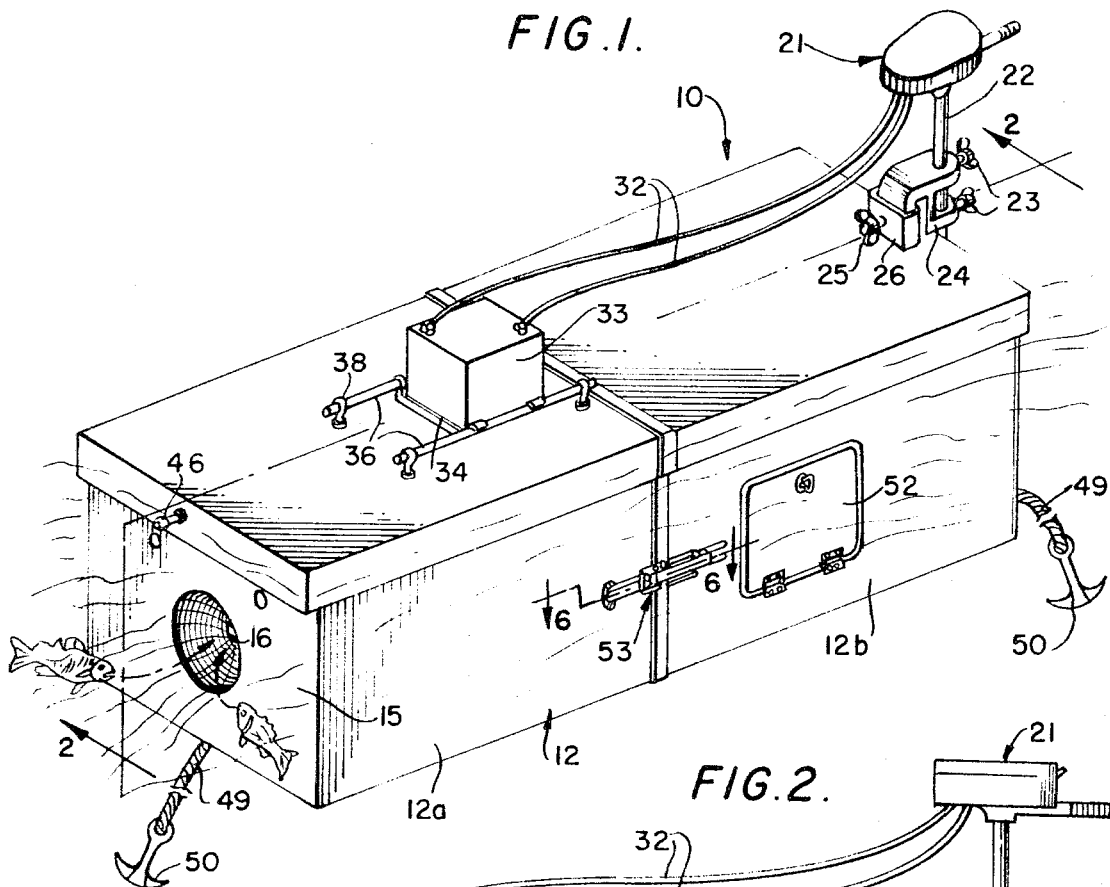
FIG. 1 is a perspective view of the floating fish trap of the invention.
Figure 2:
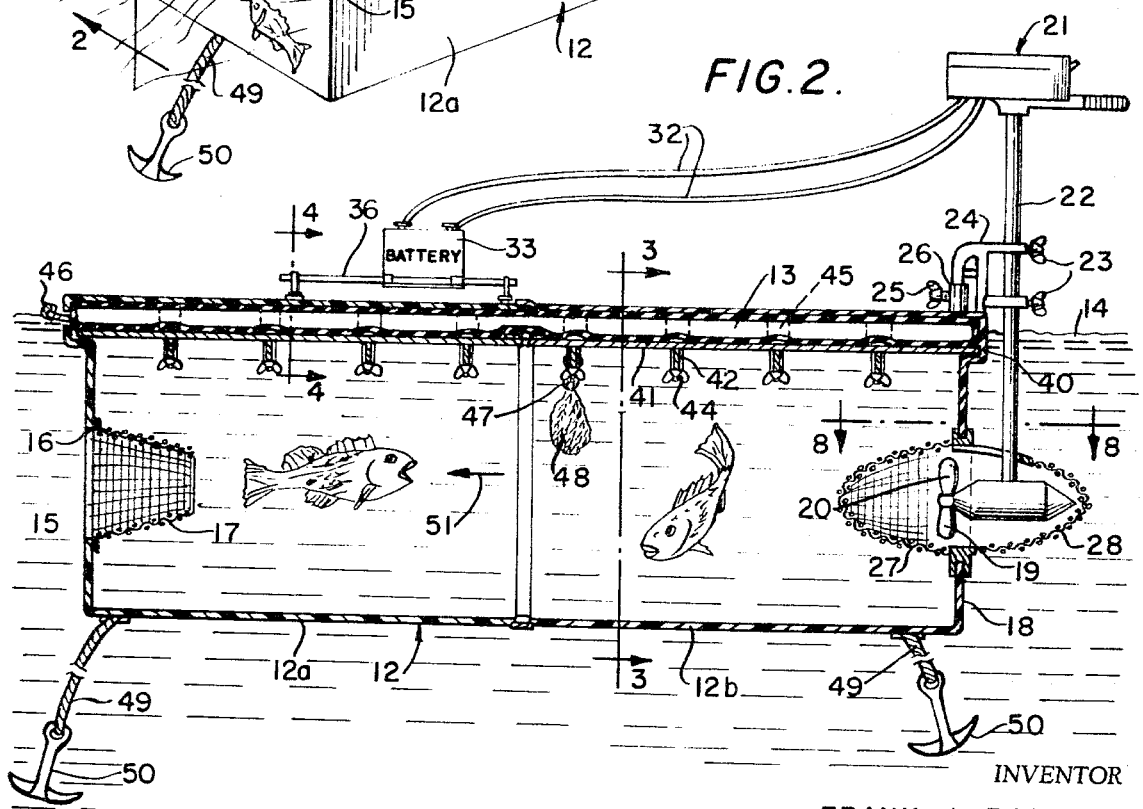
FIG. 2 is a longitudinal sectional view, taken substantially in the plane of the line 2—2 in FIG. 1.

Referring now to the accompanying drawings in detail, the general reference numeral 10 in FIGS. 1 and 2 designates a floating fish trap in accordance with the invention. The trap comprises a horizontally elongated housing 12, the top portion of which contains an inflatable pad 13 which, when inflated, enables the trap to float in water, the water surface of water line being indicated at 14.

One end wall 15 of the housing 12 is formed with an opening 16 and a foraminous fish entrance cone 17 is secured to the inside of the end wall 15 in register with the opening 16. The other end wall 18 of the housing is provided with an opening defining a water passage 19 and a water impeller 20 is provided at the passage 19, as will be apparent from FIG. 2.

The impeller 20 may be constituted by the propeller of a small electric outboard motor 21 of a conventional type, having a tubular standard 22 held by clamp screws 23 in a bracket 24 which in turn is removably held by a clamp screw 25 in a socket 26 provided on top of the housing 12. The impeller 20 is disposed inside of the housing end wall 18 and is covered by a dome-shaped protecting screen 27 so that any fish caught in the trap do not come in contact with the impeller. The screen 27 is permanently attached to the housing end wall 18. Another dome shaped protecting screen 28 is provided around the lower end portion of the motor 21 at the outside of the housing end wall 18. This outer screen is removably held in position, as by keeper pins 29 engaging bayonet slots 30 as shown in FIG. 9. The slots 30 are formed in an annular rim 30' of the screen 28, while the pins 29 project inwardly from the edge of the opening in the end wall which defines the passage 19. As will be apparent from FIG. 8, the screen 28 is recessed as at 31 to receive the standard 22 of the motor 21 when the screen is installed in position.

Figure 4:
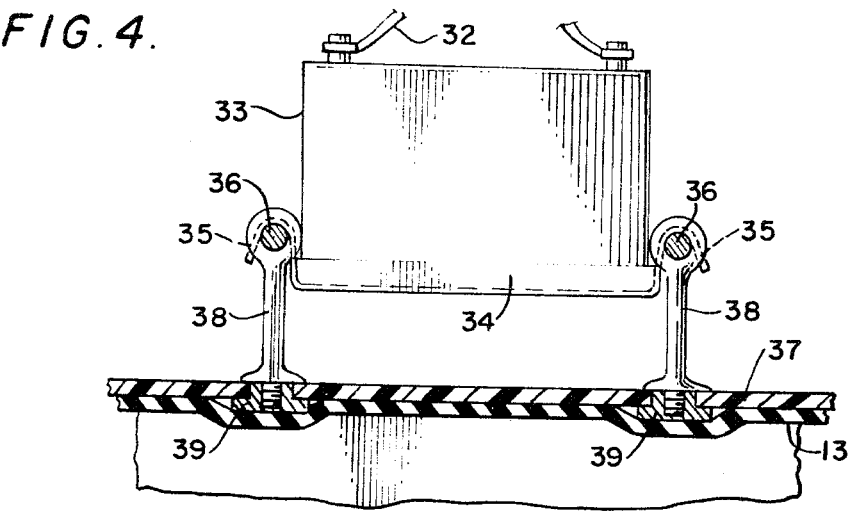
FIG. 4 is a fragmentary sectional view, taken substantially in the plane of the line 4—4 in FIG. 2.

The electric motor 21 is connected by cables 32 to a battery 33 which is carried by supports 34 which have hook-shaped ends 35 positioned on a pair of rods 36. These rods extend longitudinally of the housing 12 and are mounted on the housing top wall 37 by brackets 38, the latter having screw-threaded lower ends equipped with nuts 39, as shown in FIG. 4. The supports 34 are adjustable longitudinally along the rods 36, whereby the battery 33 may be placed closer to or further away from the housing end 15 in relation to the motor 21 at the housing end 18, thus affording a balancing adjustment which enables the trap to float substantially horizontally in water.

Figure 3:
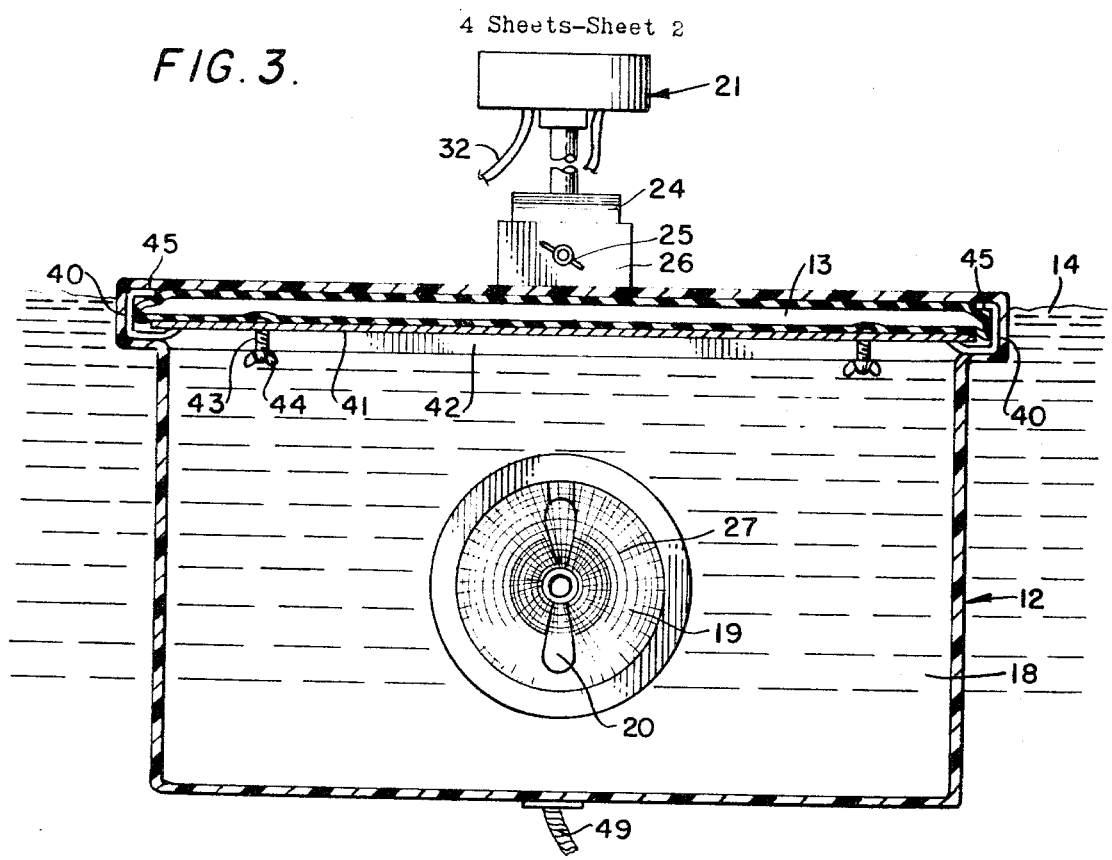
FIG. 3 is a cross-sectional view, taken substantially in the plane of the line 3—3 in FIG. 2.

The top portion of the housing 12 is ahaped to provide channels 40 in which are received the marginal edge portions of the inflatable pad 13. A pad holder 41 in the form of a rigid panel supportably underlies the pad 13. A set of longitudinally spaced straps 42 extend transversely of the underside of the holder 41 and are removably attached thereto by slotted screws 43 and nuts 44, as is best shown in FIG. 5. The straps 42 have hook-like end portions 45 which extend above the holder 41 and engage the marginal edge portions of the inflatable pad 13, as will be apparent from FIG. 3. The pad 13 with the holder 41 and the straps 42 may be installed in the channels 40 as a unit, whereupon the pad may be inflated through a suitable inflating nipple 46. A plurality of hooks or loops 47 are suspended from the straps 42 so that suitable fish bait 48 may be attached thereto.

The bottom of the housing 12 is provided with one or more ropes or cables 49 having anchors 50 thereon, so that the trap may be held against movement in water.

In operation, the motor 21 is energized to rotate the impeller 20 in such direction that outside water is drawn through the passage 19 into the housing 12 and discharged as a water stream through the fish entrance 17, the direction of flow being indicated by the arrow 51 in FIG. 2. Since the trap is located close to the water surface 14 where oxygen is more plentiful than further down, and since the operation of the impeller 20 creates turbulence which further assists in absorption oxygen into the water, the water stream discharged through the fish entrance 17 has a substantial oxygen content and, in addition, is scented by the bait 48 in the housing. Consequently, fish in the vicinity of the trap become stimulated and, by their natural tendency they swim against the water stream and into the housing 12 through the entrance 17. After being caught in the trap, the fish may be removed through a suitable access door 52 provided in one side of the housing.

The trap may be of considerable length and for purposes of compact transportation and storage it may be desirable to form the housing 12 in two complemental half-sections 12, 12b which are separably connected together by fasteners 53 shown in FIGS. 1, 6 and 7. Each such fastener may comprise a rod 54 attached, for example, to the section 12b as at 55 and connected by a pivot 56 to a link 57. Another rod 58, pivoted to the link 57 as at 59, has a hooked end 60 separably engageable with a grommet 61 in the housing section 12a. A cam lever 62 is provided on the pivot 59 and arranged so that when the lever is in the position shown in FIG. 7, the hook 60 of the rod 58 may be engaged with the grommet 61. The lever 62 may then be moved to the closed position shown in FIG. 6, in which the cam portion 62' of the lever bears against the housing section 12a and the pivot 59 is moved outwardly, thus causing the hook 60 of the rod 58 to lock in the grommet 61 and hold the two housing sections 12a, 12b together.

The aforementioned holder panel 41 for the inflatable pad 13 is also made in two half-sections 41a, 41b and these are connected together by hinges 63 (see FIG. 5), so that when the housing sections 12a, 12b are separated and the pad 13 with the holder 41 are removed from the channels 40 of the housing, the holder panel 41 may be folded upon itself about the hinges 63 for compact storage or transportation.

Figure 10:
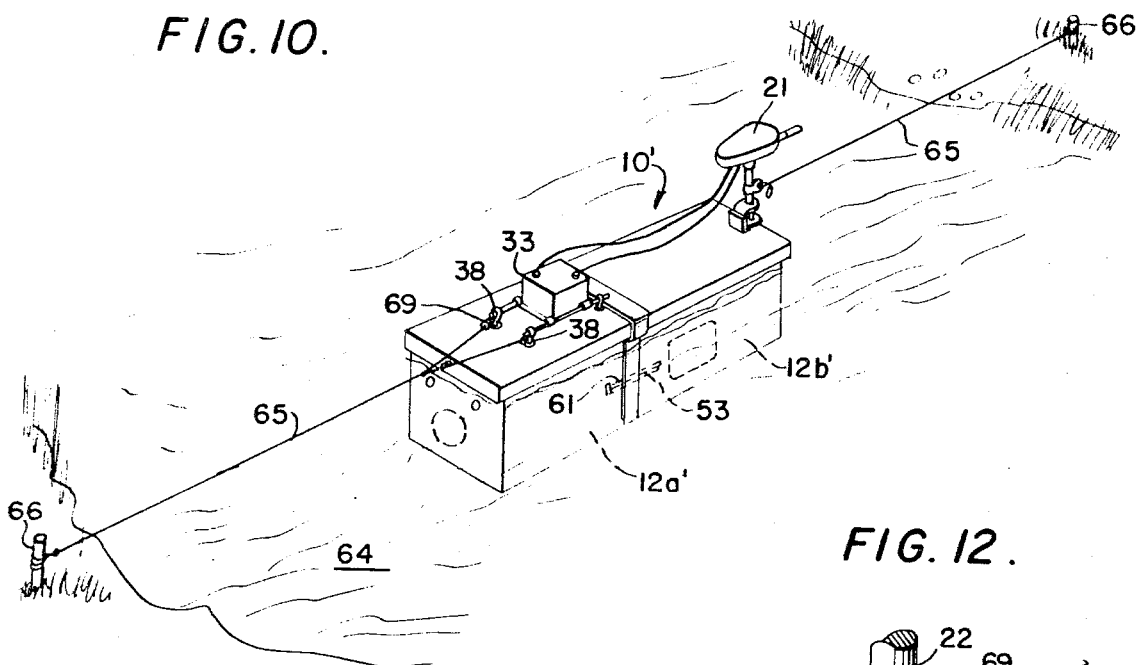
FIG. 10 is a diagrammatic view showing a modified form of the invention staked in position in a pond of water.
Figure 11:
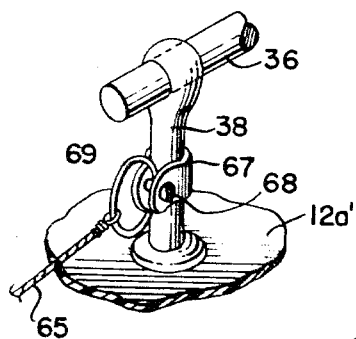
FIG. 11 is a detail perspective view showing a cord ring attached to a battery rack post.
Figure 12:
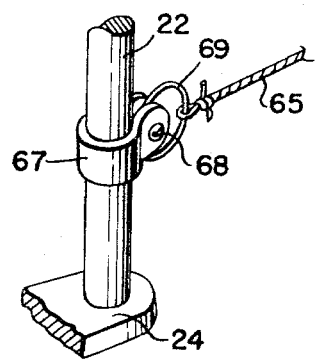
FIG. 12 is a detail perspective view showing a cord ring attached to the motor tubular housing.

FIGS. 10–14 illustrate a slightly modified form of the invention 10' wherein the fish trap includes a housing 12' having a front section 12a' which is slightly smaller in external dimensions of width and height than the rear section 12b' so that the front section 12a' may be telescoped within the rear section 12b' for shipping or storage. In order to telescope the two sections when the finish trap is not in use the front section must be free of external appurtenances which would interfere with telescoping the two parts. As shown in FIG. 10 instead of providing anchors attached by ropes 49 to the bottom of the respective housing sections 12a and 12b illustrated in FIGS. 1 and 2, the modified form 10' has front and rear staking cords 65,65 attached by rings 69 and screw clamps 67 respectively to the posts 38 of the battery rack and to the tubular standard 22 of the electric outboard motor. The cords 65 extend from the fish trap 10' to stakes 66 on opposite banks of a fish pond 64 thus fixing the position of the fish trap in the fish pond. FIG. 11 is an enlarged detail view showing the anchor ring 69 clamped to one of the front battery rack posts 38 by a circular clamp 67 which is tightened around the post 38 by means of screw 68, extending through an aperture in one end of the clamp and threadedly engaging the other end of the clamp or extending through the other end of the clamp and engaging a nut (not shown). FIG. 12 is an enlarged detail view illustrative of an anchor ring 69 clamped to the motor standard 22 in the same manner as the front rings 69 are attached to the posts 38.

Figure 13:
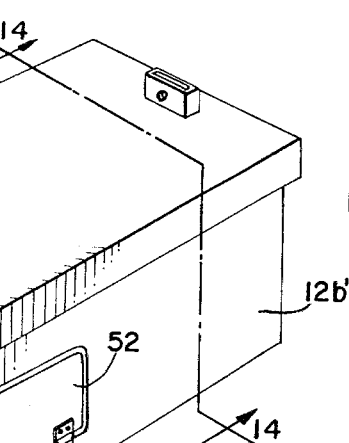
FIG. 13 is a perspective view of the modified form of the invention showing complemental parts of the fish trap housing telescoped in stacked relationship for storage.
Figure 14:
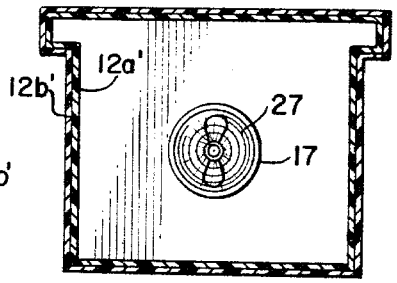
FIG. 14 is a transverse cross sectional view taken in the plane of the line 14—14 in FIG. 13.

When the fish trap is not being used the battery rack posts 38 can be unscrewed from their sockets 39 (see FIG. 4) and the front and rear sections unclamped from their assembled condition by loosening the clamp 53 so that the hooked end 60 will be disengaged from the aperture 61 in the side of front housing section 12a'. This leaves the front section 12a' free of external obstructions and permits the front section 12a' to be telescoped within the rear section 12b' by turning the front section end for end 180° so that the front end 15 enters the open end of the rear section 12b'. The stacked relationship of the front and rear sections 12a and 12b is shown in FIGS. 13 and 14 where in the front entrance cone 17 slips over the protecting screen 27, as best seen in the sectional view in FIG. 14.

The modified form of the fish trap 10' is similar to the fish trap form 10 in all respects other than those features pointed out adapting the front and rear housing sections 12a' and 12b' for telescoping into a stacked relationship for shipping and storage.

While in the foregoing there has been described and shown the preferred embodiment of the invention, various modifications and equivalents may be resorted to within the spirit and scope of the invention as claimed.

What is claimed as new is:

1. A floating fish trap, comprising in combination a horizontally elongated housing adapted to float in water, bait holding means in said housing, a fish entrance cone provided in one end of the housing, the other end of the housing being formed with a water passage, a water impeller provided at said passage, and power means mounted on said housing for driving said impeller whereby a stream of water may be caused to flow through the housing and out of said fish entrance.

2. The device as defined in claim 1 wherein said housing consists of a pair of complemental half-sections separably secured together.

3. The device as defined in claim 1 together with an inflatable pad provided at the top of said housing for floating the same in water.

4. The device as defined in claim 1 wherein said power means includes a portable electric motor removably mounted on said housing and driving said impeller.

5. The device as defined in claim 4 together with an electric battery mounted on top of said housing and in circuit with said motor.

6. A floating fish trap, comprising in combination a horizontally elongated housing adapted to float in water, bait holding means in said housing, a fish entrance cone provided in one end of the housing, the other end of the housing being formed with a water passage, a water impeller provided at said passage whereby a stream of water may be caused to flow through the housing, a portable electric motor removably mounted on said housing and driving said impeller, an electric battery mounted on top of said housing and in circuit with said motor, and means adjustably mounting said battery on said housing for balancing adjustment longitudinally of said housing.

7. The device as defined in claim 1 together with means for anchoring said housing to prevent movememt thereof through water.

8. The device as defined in claim 1 together with a protective screen for said impeller provided at said water passage at the inside of said housing.

9. A floating fish trap, comprising in combination a horizontally elongated housing adapted to float in water, bait holding means in said housing, a fish entrance cone provided in one end of the housing, the other end of the housing being formed with a water passage, a water impeller provided at said passage whereby a stream of water may be caused to flow through the housing, the top portion of said housing being provided with channels, and an inflatable pad removably positioned in said channels for floating the housing in water.

10. The device as defined in claim 9 together with a plate-shaped pad holder of rigid material removably positioned in said channels, and means removably attaching said inflatable pad to said holder.

11. The device as defined in claim 10 wherein said means removably attaching said pad to said holder comprise a set of longitudinally spaced straps extending transversely of the underside of said holder, said straps having hook-shaped end portions disposed above the holder and removably receiving side edge portions of said pad therein.

12. The device as defined in claim 11 together with screw-threaded fasteners removably securing said straps to said holder.

13. The device as defined in claim 11 wherein said bait holding means in said housing are suspended from said straps.

14. The device as defined in claim 10 wherein said housing consists of a pair of complemental half-sections separably connected together, said plate-shaped pad holder consisting of a pair of hingedly connected half-sections.

15. The device as defined in claim 1 together with an access door provided at one side of said housing.

16. A floating fish trap comprising a horizontally elongated housing adapted to float in water, a fish entrance cone provided in one end of the housing, the other end of the housing being formed with a water passage, a water impeller provided at said passage, and power means for driving said impeller whereby a stream of water may be caused to flow through the housing.

17. The device as defined in claim 16 wherein said housing consists of a pair of complemental half sections separably secured together.

18. The device as defined in claim 17 wherein one half section has larger internal transverse sectional dimensions than the external transverse sectional dimensions of the other half section so that the smaller half section may be telescoped within the larger half section for storage and shipping.

19. The device as defined in claim 16 together with front and rear staking cords for positioning said housing in a body of water in fixed relationship to the banks surrounding the body of water and means securing one end of each of said front and rear cords adjacent the top of said housing.

20. The device as defined in claim 1 together with buoyant means provided at the top of said housing for floating the same in water.

21. The device as defined in claim 1 wherein the top portion of said housing is provided with channels and buoyant means removably positioned in said channels for floating the housing in water.

22. A floating fish trap comprising a horizontally elongated housing adapted to float in water, a fish entrance funnel provided in one end of the housing, and the other end of the housing being formed with a screened water passage, said housing consisting of a pair of complemental half sections separably secured together, each half section including a bottom wall, a pair of side walls upstanding from opposite side edges of said bottom wall, a top wall, and one end wall across one end, said pair of side walls being offset outwardly adjacent the top wall to form a pair of channel shaped recesses extending longitudinally adjacent opposite edges of said top wall, the other end of each half section being open, the half sections being assembled with their open ends adjacent each other and their closed ends forming the opposite ends of the fish trap, and buoyant means within the housing adjacent the top wall and removably positioned in said channels for floating the housing in water.

23. The device as defined in claim 22 wherein one housing half section is formed to permit its closed end to telescope through the open end of the other half section for stacking.

* * * * *